United States Patent [19]

Chinzi

[11] Patent Number: 5,593,784
[45] Date of Patent: Jan. 14, 1997

[54] GLAZING UNIT AND A METHOD FOR ITS MANUFACTURE

[75] Inventor: Calogero Chinzi, La Louvière, Belgium

[73] Assignee: Glaverbel, Brussels, Belgium

[21] Appl. No.: 347,148

[22] Filed: Nov. 22, 1994

[30] Foreign Application Priority Data

Nov. 23, 1993 [GB] United Kingdom ............... 9324069

[51] Int. Cl.$^6$ .............................. B32B 27/38; B32B 9/04; B32B 27/06; B32B 27/32
[52] U.S. Cl. ........................ 428/413; 428/448; 428/451; 428/480; 428/523
[58] Field of Search ................................... 428/413, 448, 428/451, 523, 480

[56] References Cited

U.S. PATENT DOCUMENTS

| | | | |
|---|---|---|---|
| 4,294,733 | 10/1981 | Marzouki et al. | 428/34 |
| 4,348,435 | 9/1982 | Mistrick et al. | 428/34 |

FOREIGN PATENT DOCUMENTS

| | | |
|---|---|---|
| 0241665 | 10/1987 | European Pat. Off. . |
| 0251834 | 1/1988 | European Pat. Off. . |
| 2612244 | 9/1988 | France . |
| 2167784 | 6/1986 | United Kingdom . |
| 2227207 | 7/1990 | United Kingdom . |

*Primary Examiner*—Kriellion S. Morgan
*Attorney, Agent, or Firm*—Spencer & Frank

[57] ABSTRACT

A glazing unit, including a composite glazing panel having a pair of vitreous sheets positioned parallel to one another and having respective marginal portions which face one another; an intervening layer which is comprised of polymeric material, which is sandwiched between the pair of vitreous sheets, and which has viscoelastic properties such that the composite glazing panel has a critical frequency of coincidence (or a lower or lowest critical frequency of coincidence if there is more than one), $(\phi_p)$, which is greater than a critical frequency of coincidence of a notional monolithic vitreous sheet, $(\phi_m)$, the notional monolithic vitreous sheet having a shape and an area which are the same as that of the composite glazing panel and having a mass which is equal to the total mass of vitreous material in the composite glazing panel, and an adhesive material which is in contact with each vitreous sheet of the pair of vitreous sheets at at least the respective marginal portions thereof, and which is in contact with an outer face of at least one vitreous sheet of the pair of vitreous sheets at a marginal portion thereof, wherein the adhesive material exhibits, at 20° C., an elongation of not more than 12.5% when subjected to a tensile stress of 0.1 MPa, as measured according to ISO 8339.

27 Claims, 2 Drawing Sheets

GLAZING UNIT AND A METHOD FOR ITS MANUFACTURE

BACKGROUND OF THE INVENTION

1. Field of the invention

The present invention relates to a glazing unit comprising a composite glazing panel having a pair of vitreous sheets adhered to an intervening layer of polymeric material sandwiched therebetween.

A glazing panel which consists of or includes a pair of vitreous sheets adherent to an intervening layer of polymeric material, is referred to herein as a composite panel.

References to acoustic properties of composite panels throughout this specification are references to such properties measured in accordance with the German Federal Republic Standard VDI 2.719.

2. Description of the Related Art

It is known from British patent specification GB 2227207-A (Glaverbel) to provide a composite glazing panel which consists of or includes a pair of vitreous sheets adherent to an intervening layer of polymeric material, wherein the sheets of said pair are separated by a said intervening layer of polymeric material which layer has viscoelastic properties such that the critical frequency of coincidence (or the lower or lowest critical frequency of coincidence if there is more than one) of the panel ["the coincidence frequency ($\phi_p$) of the panel"] is greater than the critical frequency of coincidence of a notional monolithic vitreous sheet ["the coincidence frequency ($\phi_m$) of the equivalent monolith"] which monolithic sheet is of the same shape and area as the panel and has a mass equal to the total mass of vitreous material in the panel.

Such a composite panel as is known from British patent specification GB 2227207-A (Glaverbel) referred to above, has, by virtue of the nature of its interlayer, improved acoustic insulating properties as compared with an otherwise similar composite panel which does not have such an interlayer. A composite panel may be installed in a building, or in a vehicle. One use for which composite panels are especially suitable is as glazings for railway carriages, particularly those of underground railway systems or of high speed transit systems where for one reason or another, ambient noise levels may be rather high.

The present invention has especial reference to the use of such composite panels in double-glazed units, the composite panel having acoustic attenuation properties. Hollow glazing units can have very good acoustic insulation characteristics, and they also afford good thermal insulation.

The commercial demand is more and more to install the panels in glazing bays by adhesively securing the panels to the support structure instead of mounting the panels in a chassis having a U-section profile, in which the edges of the panel are retained. This recent technique of panel installation is often referred to as "exterior panel adhesive fixing" or (somewhat improperly) as "structural glazing". This technique allows one to form facades which appear to be totally glazed. It also allows one to install the panels in a flush manner with the body-work of a vehicle for example. This technique allows one to obtain advantageous aesthetic effects.

There are two general methods possible for the manufacture of such units. Firstly, the composite panel may be assembled together with a frame in the factory and then the assembled unit is secured in position at the building site or vehicle construction works, depending on the intended use of the unit. Alternatively, the unit is assembled directly at the building site or vehicle construction works, where the unit is fixed to a frame or to the supporting structure rather than being retained in a U-section chassis.

At an elevated temperature such as about 50° C., for example in sunshine, the intervening polymeric material of the composite panel has a tendency to flow, since its modulus of elasticity generally varies with temperature. The external sheet of vitreous material, which is held to the rest of the structure by the intervening polymeric material therefore tends to become loose and may even fall out of the structure.

SUMMARY OF THE INVENTION

It is an object of the present invention to enable the more secure fixing of composite panels in glazing structures in the field of structural glazing.

According to the invention, there is provided a glazing unit comprising a composite glazing panel having a pair of vitreous sheets adhered to an intervening layer of polymeric material sandwiched therebetween characterised in that said polymeric material layer has viscoelastic properties such that the critical frequency of coincidence (or the lower or lowest critical frequency of coincidence if there is more than one) of the panel ["the coincidence frequency ($\phi_p$) of the panel"] is greater than the critical frequency of coincidence of a notional monolithic vitreous sheet ["the coincidence frequency ($\phi_m$) of the equivalent monolith"] which monolithic sheet is of the same shape and area as the panel and has a mass equal to the total mass of vitreous material in the panel, and an adhesive material is in contact with each vitreous sheet, at at least facing marginal portions thereof, wherein said adhesive material exhibits, at 20° C., an elongation of not more than 12.5% when subjected to a tensile stress of 0.1 MPa, preferably when subjected to a tensile stress of 0.14 MPa, as measured according to ISO 8339 (method A), and in that there is such an adhesive material in contact with an outer face of at least one of said sheets at a marginal portion thereof.

We have discovered that it is possible to install a glazing unit comprising a composite glazing panel formed with an intervening layer of a polymer material, the viscoelastic properties of which provide acoustic isolation properties in the form of an exterior panel adhesively secured to the structure of the building or vehicle.

It is surprising that the vitreous sheets of the composite panel can be secured with the aid of an adhesive material, the mechanical properties of which tend to render the connection between the sheets more rigid, thereby putting the acoustic properties of the panel at risk.

The adhesive material is preferably such a material that exhibits, at 20° C., an elongation of not more than 12.5% when subjected to a tensile stress of 0.14 MPa. In particular said adhesive material exhibits, at 20° C., an elongation of not more than 12.5% when subjected to a tensile stress of 0.1 MPa after ageing for 500 hours in water at 55° C. Ideally, the adhesive material exhibits said elongation of not more than 12.5% when subjected to a tensile stress of 0.14 MPa after ageing in water for 1000 hours at 45° C.

We mostly prefer that the adhesive material exhibits an elongation of not more than 12.5% when subjected to a tensile stress of 0.1 MPa, preferably of 0.14 MPa over a temperature range of −20° C. to 55° C., preferably over a temperature range of −40° C. to 70° C.

We prefer that the adhesive material exhibits a rupture strength at 20° C. of more than 0.70 MPa, preferably at least 0.84 MPa, and a deformation at rupture of greater than 50%.

The most preferred adhesive material exhibits cohesive rupture when subjected to a tensile stress in excess of the rupture strength thereof.

Preferably, said adhesive material is selected from silicone adhesive materials, but polysulphide and polyurethane adhesive materials may also be used. When a polysulphide or other light sensitive material is used, it is preferred to include in the glazing unit means to shield the adhesive material from sunlight. Such means may comprise, for example, a UV shield coating on the exterior sheet of vitreous material or a band of vitreous enamel formed by silk-screen printing.

The nature of the polymeric material for forming the interlayer is of considerable importance for the performance of the composite panel. There are a number of materials which have the required properties and could in fact be used. Among such materials may be cited materials which are conventionally used for forming laminated glazing composite panels but which are modified by the addition of rather large quantities of plasticizer. Examples of compositions for forming such layers are: 2 parts by weight of polyvinyl butyral with 1 part by weight of a plasticizer such as FLEXOL (Trade Mark) from UNION CARBIDE and a copolymer of 99 parts by weight polyvinyl chloride and 1 part by weight of glycidyl methacrylate with 40 parts by weight of a plasticizer such as dioctylsebacate. However because of their very high content of plasticizer, handling problems arise and films of such materials are very difficult to incorporate into glazing composite panels on a commercial scale. Suitable intervening polymeric layer materials are selected from polyesters, vinyl polymers, epoxy resins, and especially acrylic resins. Such materials afford a number of polymers having exceptional acoustic properties. For a given desired level of acoustic insulation, the use of such a polymer can allow a significant reduction in the thickness and thus in the weight of vitreous material which has to be incorporated in the composite panel. This is of particular importance when the composite panel is to be incorporated into a window of a vehicle, for example a passenger coach of a train, especially if the coach has a high glazed area. A further important advantage of the use of such polymers is that they can incorporate catalysts and/or actuators so that they may easily be polymerised in situ. The polymer can be incorporated between the two vitreous sheets in a fluid state and then polymerised. This greatly facilitates manufacture of the composite panel as compared with the use of a preformed film of highly plasticized polymer. In the most preferred embodiments of the invention, such polymer is an acrylic resin which is polymerizable by ultra-violet radiation.

Advantageously, the material of which said intervening layer is formed has a Shore A hardness measured at 20° C. of not more than 50, and preferably not more than 30. The adoption of this feature tends to promote a very efficient acoustic attenuation.

Preferably, the critical frequency of coincidence of the composite panel is 1.2 times, most preferably 1.5 times the critical frequency of coincidence of the notional monolithic vitreous sheet.

It is of advantage if at least one portion of one of said vitreous sheets overlaps an edge of the other of said vitreous sheets, said overlapping marginal portion preferably extending around the periphery of said composite panel. It is of advantage if the two sheets of the composite glazing panel have overlapping edges because the adhesive in contact with each sheet of the pair can be positioned more easily than when it must be inserted into the narrow space between the sheets. When the unit is in the form of double-glazed unit, the sealing adhesive of the double glazed unit and the adhesive in contact with the sheets of the composite panel can be positioned in one and the same step.

This arrangement is surprisingly advantageous because, for the same depth of point, the tendency to make the connection between the sheets more rigid is reduced. We have discovered that, not only does this connection between the sheets enable installation of the structural glazing type, but this arrangement also enables one to obtain particularly high acoustic isolation properties.

The glazing unit according to the invention may be secured directly to a frame or to the support structure of the panel with the aid of the said adhesive material. Preferably, the glazing unit according to the invention is in the form of a double-glazed unit including a second glazing panel positioned in face-to-face spaced relationship to said composite panel, adhesive material being in contact with said second glazing panel.

Advantageously, said second panel consists of a single unlaminated sheet of vitreous material. Such a sheet is very much less costly to produce than a composite panel. The use of a spacer assists in positioning of the second glazing sheet. A suitable spacer is known as a "Swiggle Strip" (Trade Mark) from TREMCO SA, of F-75643 Paris, Cedex 13, which is a pre-extruded butyl ribbon having a metal core and containing a molecular sieve desiccant powder. The spacer acts additionally as a moisture barrier.

The glazing unit according to the invention may further comprise a rigid frame, said glazing panel being secured to said frame with the aid of the adhesive material which is in contact with said frame.

Where the glazing unit is assembled to a frame, any space between the vitreous sheets and the frame is preferably filled with a sealant material, such as a silicone material having a low modulus of elasticity, acting to seal the glazing unit as a whole from the ingress of moisture.

Means for indicating the ingress of water may be incorporated in the air spacer between the glazing panels. These means may be in the form of a container formed of polymeric material containing a composition comprising a desiccant such as silica gel and a humidity indicator such as cobalt chloride. The container may be formed with pins on its underside, to enable it to be retained against the spacer in use. If the sealing of the unit should fail during use, the ingress of atmospheric moisture will cause the cobalt chloride indicator to pass from a blue to a pink colour. This colour change can be used as an alarm to indicate possible failure of the unit and the need to submit the unit to further tests to determine whether repair or replacement is necessary.

A composite panel may be formed from two or more vitreous sheets which are of equal thickness, or there may be an inequality of thickness between the sheets, the latter arrangement leading to different acoustic isolation properties.

Preferably, all the vitreous sheets of the unit have been subjected to a thermal tempering treatment. The unit may thus serves as an escape window. The viscoelastic properties of the intervening polymer material in general allow this material to be easily cut away. When all the sheets of a unit are broken into small fragments, it is then relatively easy to escape therethrough.

Preferably, said composite panel affords an acoustic attenuation $R_w$ of at least 37 dB. Such an acoustic attenuation gives considerable benefits in the comfort of various locations, and is especially useful in environments where external noise levels are rather high, such as for example in railway carriages.

In one embodiment of the invention, the adhesive material which is in contact with each vitreous sheet is continuous with the adhesive material which is in contact with said marginal portion of the outer face of at least one of said sheets. This arrangement is particularly convenient when at least one portion of one of said vitreous sheets overlaps an edge of the other of said vitreous sheets Alternatively, the adhesive which is in contact with each vitreous sheet is discontinuous with the adhesive material which is in contact with said marginal portion of the outer face of at least one of said sheets. This arrangement is particularly convenient when there is no overlap between edge portions of the vitreous sheets.

Whether the adhesive material is continuous or discontinuous, it is convenient if the adhesive material which is in contact with each vitreous sheet is the same material as the adhesive material which is in contact with said marginal portion of at least one of said sheets.

The invention also provides a method of constructing a glazing unit comprising the steps of:

positioning a pair of vitreous sheets in face-to-face spaced relationship to each other to form a composite glazing panel;

filling the space between said pair of vitreous sheets with an intervening polymer, wherein said polymeric material layer has viscoelastic properties such that the critical frequency of coincidence (or the lower or lowest critical frequency of coincidence if there is more than one) of the panel ["the coincidence frequency ($\phi_p$) of the panel"] is greater than the critical frequency of coincidence of a notional monolithic vitreous sheet ["the coincidence frequency ($\phi_m$) of the equivalent monolith"] which monolithic sheet is of the same shape and area as the panel and has a mass equal to the total mass of vitreous material in the panel, characterised by positioning an adhesive material in contact with each vitreous sheet of said pair at least facing marginal portions thereof, wherein said adhesive material exhibits, at 20° C., an elongation of not more than 12.5% when subjected to a tensile stress of 0.1 MPa, as measured according to ISO 8339 (method A), there being such an adhesive material in contact with an outer face of at least one of said sheets at a marginal portion thereof.

The method usefully includes the step of disposing a ribbon of sealing material between said vitreous sheets adjacent the periphery thereof, said ribbon having at least one interruption to enable the injection of said polymer into the space between the vitreous sheets, said ribbon delimiting the area occupied by the polymeric material in said composite panel. To enable this method of construction to be achieved, the polymeric material is preferably pourable at 20° C. Alternatively, a polymer precursor is injected into the space between the vitreous sheets and the method proceeds by causing or allowing said polymer precursor to polymerise to a polymer. The polymer precursor may be such as can be polymerised by external means, such as for example by exposure to UV radiation, or such as can be polymerised by internal means, such as by including a chemical hardener in the precursor composition. After said injection of polymer or precursor, said interruption in said ribbon of sealing material may be closed by the provision of further sealing material.

The pair of vitreous sheets may be so positioned relative to each other that at least one portion of one of said vitreous sheets overlaps an edge of the other of said vitreous sheets.

The method according to the invention may include the further step of positioning a second glazing panel in face-to-face spaced relationship to said composite glazing panel, thereby to form a double-glazed unit, adhesive material being positioned in contact with said second glazing panel. When the sheets of the composite panel are disposed in an overlapping position as aforesaid, the method may include the positioning of the adhesive material and the sealing of the double-glazed unit simultaneously.

BRIEF DESCRIPTION OF THE DRAWINGS

The invention will now be further described, by way of example, by reference to the accompanying drawings, in which.

DESCRIPTION OF THE PREFERRED EMBODIMENTS

Figure 1:
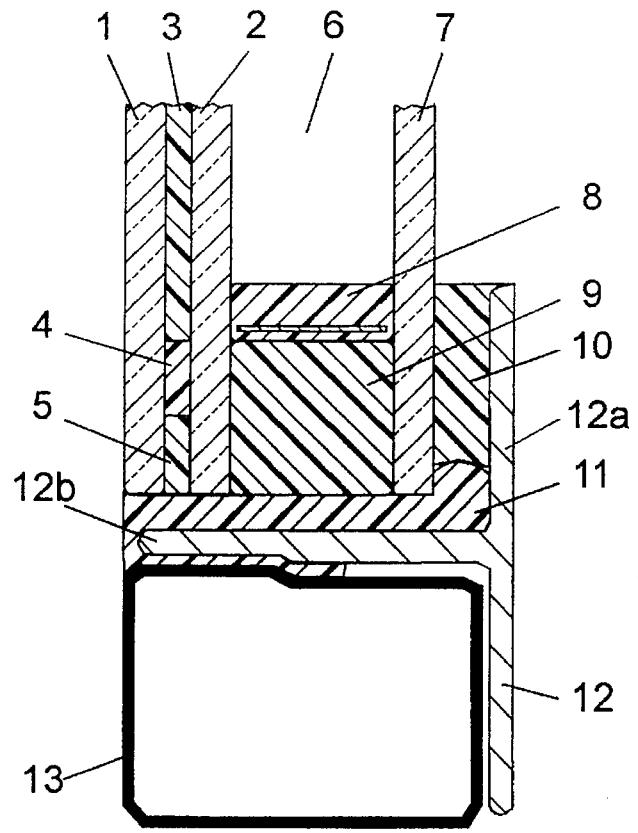
FIG. 1 is a diagrammatic cross-section through part of a glazing unit according to one embodiment of the invention.

FIG. 1 shows a glazing unit comprising a composite glazing panel having a pair of vitreous sheets 1, 2 with an intervening layer 3 of acrylic resin sandwiched therebetween. The first sheet 1 is formed of thermally tempered glass having a thickness of 6 mm and carrying a solar screening coating of STOPSOL (Trade Mark), on the internal face thereof. The second sheet 2 is formed of thermally tempered glass having a thickness of 5 mm and carrying a low emissivity coating. A low emissivity coating is provided on that face of the sheet 2 which is disposed remote from the sheet 1. The first sheet 1 constitutes the exterior sheet of the glazing unit.

The acrylic resin layer 3 has viscoelastic properties such that the critical frequency of coincidence of the panel is greater than the critical frequency of coincidence of a notional monolithic vitreous sheet which is of the same shape and area as the panel and has a mass equal to the total mass of vitreous material in the panel. A suitable acrylic resin is UVEKOL (Trade Mark) from UCB SA, of B-1620 Drogenbos, Belgium.

A silicone bonding adhesive material 5 is in contact with each vitreous sheet 1, 2, to the extent of about 8 mm from the peripheral edge thereof. The silicone bonding adhesive material 5 serves to prevent delamination of the composite panel, even after ageing as a result of mechanical or climatic conditions in use. The preferred silicone bonding adhesive material is "Q 3362" from DOW CORNING, having an elongation of 12.5% when subjected to a tensile stress of 0.27 MPa, before ageing and an elongation of 12.5% when subjected to a tensile stress of 0.2 MPa, after ageing for 21 days in water at 55° C., as measured according to method A of ISO 8339. The rupture strength of this material is 1.08 MPa before ageing, and 0.92 MPa after ageing, the elongation at rupture being more than 50% and .the rupture being cohesive, both before and after ageing. A further region of similar silicone bonding material 9 is in contact with the outer face of sheet 2.

The glazing unit shown in FIG. 1 is in the form of a double-glazed unit including a second glazing panel 7, formed of a sheet of 5 mm thermally tempered glass, positioned in face-to-face relationship to sheet 2 of the composite panel, and spaced therefrom to provide an air space 6 of 12 mm. A "Swiggle Strip" spacer 8 assists in positioning of the second glazing panel 7. The spacer acts additionally as a moisture barrier.

The adhesive material 9 is in contact with second glazing panel 7, and serves to secure the composite panel to the second glazing panel 7.

The glazing unit according to FIG. 1 further comprises a rigid aluminium profile frame 12. A further region of silicone bonding material 10 is disposed between, and in contact with, the second glazing panel 7 and an upper limb 12a of the frame 12 to secure the glazing panel to this frame.

The silicone bonding material 10 may be "Q 33993" from DOW CORNING, having an elongation of 12.5% when subjected to a tensile stress of 0.25 MPa, before ageing and an elongation of 12.5% when subjected to a tensile stress of 0.2 MPa, after ageing for 21 days in water at 55° C., as measured according to method A of ISO 8339. The rupture strength of this material is 0.98 MPa before ageing, and 0.78 MPa after ageing, the elongation at rupture being more than 50% and the rupture being cohesive, both before and after ageing.

The space between the vitreous sheets and the horizontal limb 12b of the frame 12 is filled with a silicone sealant material 11, having a low modulus of elasticity, acting to seal the glazing unit as a whole from the ingress of moisture. The silicone sealant material 11 may be "Q 33797" ex Dow Corning. It is however possible to use the same silicone material for all the elements 5, 9, 10 and 11.

In a further variation, a polyurethane adhesive material may be used, such as from TEROSON, with an aliphatic UV protection primer or a band of vitreous enamel formed by silk-screen printing, positioned along portions of the panel to protect the adhesive against UV degradation.

The method of constructing the glazing unit according to FIG. 1 comprises the following steps. Firstly, the pair of vitreous sheets 1, 2 are positioned in face-to-face spaced relationship to each other. A ribbon 4 of butyl sealing material having a width of 8 mm is disposed between the sheets 1 and 2 at a distance of approximately 8 mm from the peripheral edges thereof. This ribbon is formed by placing a cylindrical cordon of the butyl sealing material on one of the vitreous sheets and squeezing the cordon into a ribbon of the specified width by pressing the two sheets together. The ribbon 4 is continuous save for two interruptions (not shown) to enable, respectively, the evacuation of the space between the vitreous sheets and the injection into that space of an acrylic resin precursor, the ribbon delimiting the area occupied by the polymeric material in said composite panel. After the injection of the precursor, the interruption in the ribbon of sealing material is closed by the provision of further sealing material. The acrylic resin precursor is then caused to polymerise to the resin by exposure to ultra-violet radiation.

The region 5 of the silicone bonding material is then positioned between the peripheral margins of, and in contact with, each sheet 1, 2.

The next step of the process is the positioning of the spacer 8, optionally followed by the positioning of a container formed of polymeric material containing a composition comprising a silica gel desiccant and cobalt chloride. The container, (not shown) formed with pins on its underside, is retained against the spacer 8. If the sealing of the unit should fail during use, the ingress of atmospheric moisture will cause the cobalt chloride indicator to pass from a blue to a pink colour. This colour change can be used as an alarm to indicate possible failure of the unit and the need to submit the unit to further tests to determine whether repair or replacement is necessary.

The second glazing panel 7 is put in place and a region 9 of similar silicone bonding material is then positioned in contact with the peripheral marginal portion of the sheet 2, on the outer face thereof. The unit is then secured to the frame 12 by the adhesive 10.

The frame 12 of the glazing unit is secured (by means not shown) to the chassis 13 of a vehicle. Reference 13 may equally represent the structure of a building in which the glazing unit is disposed.

Figure 2:
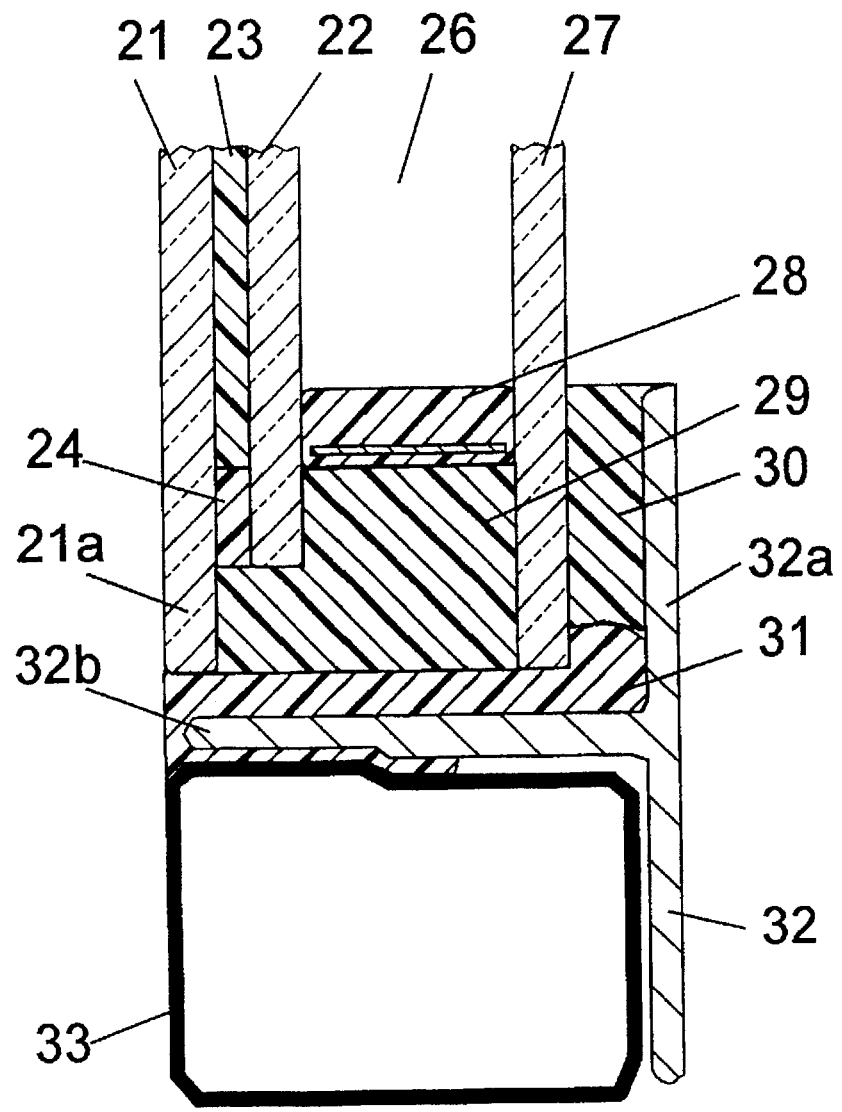
FIG. 2 is a diagrammatic cross-section through part of a glazing unit according to an alternative embodiment of the invention.

The glazing unit shown in FIG. 2 is similar to that shown in FIG. 1, except as detailed below, and uses the same materials as the unit of FIG. 1.

The glazing unit shown in FIG. 2 comprises a composite glazing panel having a pair of vitreous sheets 21, 22 with an intervening layer 23 of acrylic resin sandwiched therebetween. A ribbon 24 of butyl sealing material is disposed between the sheets 21 and 22. A portion 21a of the vitreous sheet 21 overlaps an edge of the other vitreous sheet 22, by a distance of about 8 min. Although not shown in the Figures, it is a preferred construction that the overlapping portion 21a extends around the whole periphery of the composite panel.

A region of silicone bonding material 29 is in contact with each vitreous sheet 21, 22, and is in contact with the outer face of sheet 22.

The glazing unit shown in FIG. 2 is in the form of a double-glazed unit including a second glazing panel 27 positioned in face-to-face spaced relationship to sheet 22 of the composite panel, and spaced therefrom to provide an air space 26. A spacer 28 assists in positioning of the second glazing panel 27. The adhesive material 29 is in contact with second glazing panel 27.

The glazing unit according to FIG. 2 further comprises a rigid aluminium profile frame 32. A further region of silicone bonding material 30 is disposed between, and in contact with, the second glazing panel 27 and an upper limb 32a of the frame 32 to secure the glazing panel to this frame. The space between the vitreous sheets and the horizontal limb 32b of the frame 32 is filled with a silicone sealant material 31, having a low modulus of elasticity, acting to seal the glazing unit as a whole from the ingress of moisture.

The frame 32b of the glazing unit is secured (by means not shown) to the chassis 33 of a vehicle. Reference 33 may equally represent the structure of a building in which the glazing unit is disposed.

As a variation of the embodiment described in relation to FIG. 2, the silicone adhesive material "GE4200" from GENERAL ELECTRIC, may be used for the bonding material 30. This material has an elongation, as measured according to method A of ISO 8339, of 12.5% when subjected to a tensile stress of 0.2 MPa before ageing, an elongation of 12.5% when subjected to a tensile stress of 0.17 MPa after ageing for 14 days in water at 55° C., and an elongation of 12.5% when subjected to a tensile stress of 0.14 MPa after ageing for 21 days in water at 55° C. The rupture strength of this material is 1.27 MPa before ageing, 0.8 MPa after ageing for 14 days, and 0.57 MPa after ageing for 21 days. The elongation at rupture was more than 50% and the rupture was cohesive, both before and after ageing for 14 days.

In a further variation, the monocomponent polyurethane adhesive material "250FC" from SIKA, may be used for the bonding material 30. This material has an elongation, as measured according to method A of ISO 8339, of 12.5% when subjected to a tensile stress of 0.25 MPa before ageing, an elongation of 12.5% when subjected to a tensile stress of 0.43 MPa after ageing for 21 days in water at 55° C. The rupture strength of this material is greater than 1.96 MPa before and after ageing. The elongation at rupture was more than 50% and the rupture was cohesive, both before and after ageing.

In the embodiment of FIG. 2, it is possible to use the same adhesive material for all the elements 29, 30 and 31.

In a variation of the embodiment shown in FIG. 2, the double glazed unit may be reversed for fixing to the frame 32 in such a manner that the panel formed by the sheets 21 and 22 faces towards the interior of the vehicle, while the sheet 27 faces towards the exterior, at the level of the outer face of the vehicle body.

Figure 3:
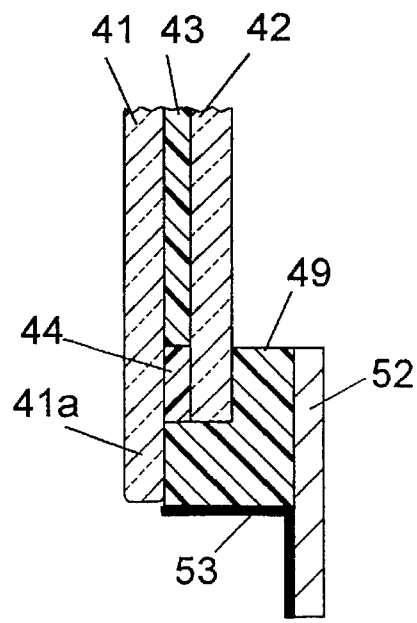
FIG. 3 is a diagrammatic cross-section through part of a glazing unit according to a further alternative embodiment of the invention.

FIG. 3 shows a composite glazing panel having a pair of vitreous sheets 41, 42 with an intervening layer 43, similar to that shown in FIG. 2. A ribbon 44 of butyl sealing material is disposed between the sheets 41 and 42. In this embodiment, the laminated panel is not mounted in a double-glazed unit (there is no sheet 27 as is used in the embodiment shown in FIG. 2). The panel is directly secured, with the aid of the adhesive 49, to an aluminium frame formed by the batten 52 and the angled profile 53. The same adhesive 49 is in contact with marginal portions of the sheets 41 and 42 and secures the unit to the frame 52. The assembly may then be fixed to the chassis of a vehicle or to the structure of a building.

What is claimed is:

1. A glazing unit, comprising:
   a composite glazing panel having a pair of vitreous sheets positioned parallel to one another and having respective marginal portions which face one another;
   an intervening layer which is comprised of polymeric material, which is adhesively sandwiched between the pair of vitreous sheets, and which has viscoelastic properties such that the composite glazing panel has a critical frequency of coincidence (or a lower or lowest critical frequency of coincidence if there is more than one), ($\phi_p$), which is greater than a critical frequency of coincidence of a notional monolithic vitreous sheet, ($\phi_m$), the notional monolithic vitreous sheet having a shape and an area which are the same as that of the composite glazing panel and having a mass which is equal to the total mass of vitreous material in the composite glazing panel, and
   an adhesive material which is in contact with each vitreous sheet of the pair of vitreous sheets at at least the respective marginal portions thereof, and which is in contact with an outer face of at least one vitreous sheet of the pair of vitreous sheets at a marginal portion thereof,
   wherein the adhesive material exhibits, at 20° C., an elongation of not more than 12.5% when subjected to a tensile stress of 0.1 MPa, as measured according to ISO 8339.

2. The glazing unit according to claim 1, wherein the adhesive material exhibits, at 20° C., an elongation of not more than 12.5% when subjected to a tensile stress of 0.1 MPa after ageing for 500 hours in water at 55° C.

3. The glazing unit according to claim 1, wherein the adhesive material exhibits, at 20° C., an elongation of not more than 12.5% when subjected to a tensile stress of 0.14 MPa.

4. The glazing unit according to claim 3, wherein the adhesive material exhibits an elongation of not more than 12.5% when subjected to a tensile stress of 0.14 MPa after ageing in water for 1000 hours at 45° C.

5. The glazing unit according to claim 1, wherein the adhesive material exhibits an elongation of not more than 12.5% when subjected to a tensile stress of 0.1 MPa over a temperature range of −20° C. to 55° C.

6. The glazing unit according to claim 5, wherein the adhesive material exhibits an elongation of not more than 12.5% when subjected to a tensile stress of 0.14 MPa over a temperature range of −20° C. to 55° C.

7. The glazing unit according to claim 6, wherein the adhesive material exhibits an elongation of not more than 12.5% when subjected to a tensile stress of 0.14 MPa over a temperature range of −40° C. to 70° C.

8. The glazing unit according to claim 1, wherein the adhesive material exhibits a rupture strength at 20° C. of more than 0.70 MPa and a deformation of rupture of greater than 50%.

9. The glazing unit according to claim 8, wherein the adhesive material exhibits a rupture strength of 20° C. of at least 0.84 MPa.

10. The glazing unit according to claim 1, wherein the adhesive material has a rupture strength, and wherein the adhesive material exhibits cohesive rupture when subjected to a tensile stress in excess of the rupture strength thereof.

11. The glazing unit according to claim 1, wherein the adhesive material is selected from silicone adhesive materials.

12. The glazing unit according to claim 1, wherein the critical frequency of coincidence of the composite glazing panel is 1.2 times the critical frequency of coincidence of the notional monolithic vitreous sheet.

13. The glazing unit according to claim 12, wherein the critical frequency of coincidence of the composite glazing panel is 1.5 times the critical frequency of coincidence of the notional monolithic vitreous sheet.

14. The glazing unit according to claim 1, wherein the intervening layer is comprised of a polymeric material which is selected from the group consisting of polyesters, vinyl polymers, epoxy resins, and acrylic resins.

15. The glazing unit according to claim 1, which is a double-glazed unit and which further comprises a second glazing panel positioned in face-to-face spaced relationship to the composite glazing panel, wherein the adhesive material is additionally positioned in contact with the second glazing panel.

16. The glazing unit according to claim 1, wherein at least one portion of one of the pair of vitreous sheets overlaps an edge of the other of the pair of vitreous sheets and is an overlapping marginal portion.

17. The glazing unit according to claim 16, wherein the composite glazing panel has a periphery, and wherein the overlapping marginal portion extends around the periphery of the composite glazing panel.

18. The glazing unit according to claim 1, further comprising a rigid frame, the composite glazing panel being secured to the rigid frame with the aid of the adhesive material, which adhesive material is in contact with the rigid frame.

19. The glazing unit according to claim 1, wherein the adhesive material which is in contact with each vitreous sheet of the pair of vitreous sheets extends and is continuous with the adhesive material which is in contact with the respective marginal portions of the outer face of at least one of the vitreous sheets.

20. The glazing unit according to claim 1, wherein the adhesive material which is in contact with each vitreous sheet of the pair of vitreous sheets is the same material as the adhesive material which is in contact with the respective marginal portions of the outer face of at least one of the vitreous sheets.

21. A method of constructing a glazing unit, comprising:

positioning a pair of vitreous sheets in face-to-face spaced relationship to each other to form a composite glazing panel having a space defined therebetween;

filling the space between said pair of vitreous sheets with an intervening layer comprised of polymeric material, wherein the intervening layer has viscoelastic properties such that a critical frequency of coincidence (or the lower or lowest critical frequency of coincidence if there is more than one) of the composite glazing panel, ($\phi_p$), is greater than a critical frequency of coincidence of a notional monolithic vitreous sheet, ($\phi_m$), the notional monolithic vitreous sheet having a shape and an area which is the same as that of the composite glazing panel and having a mass equal to the total mass of vitreous material in the composite glazing panel; and positioning an adhesive material in contact with each vitreous sheet of the pair of vitreous sheets at at least the respective marginal portions thereof, and positioning the adhesive material in contact with an outer face of at least one vitreous sheet of the pair of vitreous sheets at a marginal portion thereof, wherein the adhesive material exhibits, at 20° C., an elongation of not more than 12.5% when subjected to a tensile stress of 0.1 MPa, as measured according to ISO 8339.

22. The method according to claim 21, wherein the space between the pair of vitreous sheets is filled with a polymeric material which is a polymer precursor, and wherein the method further comprises one of causing or allowing the polymer precursor to polymerize to a polymer.

23. The method according to claim 21, further comprising disposing a ribbon of sealing material between the pair of vitreous sheets adjacent the periphery thereof, the ribbon having at least one interruption to enable introduction of a material which is one of a polymer or a polymer precursor by injection thereof into the space between the pair of vitreous sheets, the ribbon delimiting the area occupied by the polymeric material in the composite panel.

24. The method according to claim 23, further comprising closing the interruption in the ribbon of sealing material after the injection of polymer or polymer precursor by introducing further sealing material.

25. The method according to claim 21, further comprising positioning the pair of vitreous sheets relative to each other so that at least one portion of one of the pair of vitreous sheets overlaps an edge of the other of the pair of vitreous sheets.

26. The method according to claim 21, further comprising positioning a second glazing panel in face-to-face spaced relationship to the composite glazing panel, thereby to form a double-glazed unit, and wherein the adhesive material is positioned in contact with the second glazing panel.

27. The method according to claim 26, wherein the adhesive of the double glazed unit and the adhesive in contact with the pair of vitreous sheets of the composite glazing panel are positioned in the same step.

* * * * *